United States Patent
Chen

(10) Patent No.: US 10,602,577 B2
(45) Date of Patent: *Mar. 24, 2020

(54) CONTROL CIRCUIT, CONTROL METHOD AND SWITCHING POWER SUPPLY THEREOF

(71) Applicant: Silergy Semiconductor Technology (Hangzhou) LTD, Hangzhou, ZheJiang Province (CN)

(72) Inventor: Xiaoping Chen, Hangzhou (CN)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/203,806

(22) Filed: Nov. 29, 2018

(65) Prior Publication Data

US 2019/0098712 A1    Mar. 28, 2019

Related U.S. Application Data

(63) Continuation of application No. 15/587,198, filed on May 4, 2017, now Pat. No. 10,194,497.

(30) Foreign Application Priority Data

May 27, 2016 (CN) .......................... 2016 1 0364912

(51) Int. Cl.
*H05B 33/08* (2020.01)
*H02M 3/156* (2006.01)
(Continued)

(52) U.S. Cl.
CPC .......... *H05B 33/0815* (2013.01); *H02M 1/08* (2013.01); *H02M 3/156* (2013.01);
(Continued)

(58) Field of Classification Search
CPC ............ H05B 33/0815; H05B 33/0848; H05B 33/0827; H05B 33/0818; H05B 33/0851; H02M 1/08; H02M 3/156; H02M 2001/0025; H02M 1/15; H02M 2001/0032; H02M 3/33507; G09G 2310/024;
(Continued)

(56) References Cited

U.S. PATENT DOCUMENTS 8,736,236 B2  5/2014  Sun et al.
8,749,213 B2  6/2014  Chen
(Continued)

*Primary Examiner* — Renan Luque
(74) *Attorney, Agent, or Firm* — Michael C. Stephens, Jr.

(57) ABSTRACT

A control circuit for generating a switching control signal to control switching operations of a power switch in a power stage circuit, can include: a first control loop configured to receive a first voltage feedback signal, and to generate a first compensation signal; a voltage regulating circuit configured to receive an output voltage signal of the power stage circuit, and to generate a second compensation signal according to a difference between an output voltage signal of the power stage circuit during different time periods; and control and driving circuit configured to receive the first and second compensation signals and a sense voltage signal that represents a current through an inductor of the power stage circuit, and to generate an OFF signal, and a switching control signal according to the OFF signal and an ON signal.

20 Claims, 11 Drawing Sheets

(51) Int. Cl.
  *H02M 1/08* (2006.01)
  *H02M 1/15* (2006.01)
  *H02M 1/00* (2006.01)

(52) U.S. Cl.
  CPC ..... *H05B 33/0827* (2013.01); *H05B 33/0848* (2013.01); *H02M 1/15* (2013.01); *H02M 2001/0025* (2013.01); *Y02B 20/346* (2013.01)

(58) Field of Classification Search
  CPC ..... G09G 2320/064; G09G 2320/0693; G09G 2330/021; G09G 3/3413; G09G 3/342; Y02B 70/16
  See application file for complete search history.

(56) References Cited

U.S. PATENT DOCUMENTS

| | | |
|---|---|---|
| 8,760,080 B2 | 6/2014 | Yu |
| 9,081,401 B2 | 7/2015 | Liao et al. |
| 9,385,603 B2 | 7/2016 | Hang et al. |
| 9,529,373 B2 | 12/2016 | Yuan |
| 9,543,822 B2 | 1/2017 | Hang et al. |
| 9,559,591 B2 | 1/2017 | Hang et al. |
| 2006/0055433 A1* | 3/2006 | Yang ................ H02M 3/33507 327/10 |
| 2009/0273288 A1* | 11/2009 | Zhao ...................... G09G 3/342 315/185 R |
| 2010/0052552 A1* | 3/2010 | Kimura ............. H05B 33/0815 315/185 R |
| 2010/0289424 A1* | 11/2010 | Chang ............... H05B 33/0818 315/250 |
| 2012/0268022 A1* | 10/2012 | Liu .................... H05B 33/0815 315/192 |
| 2013/0033194 A1* | 2/2013 | Kang ................. H05B 33/0818 315/291 |
| 2013/0038233 A1* | 2/2013 | Chu ................... H05B 33/0815 315/224 |
| 2013/0223108 A1 | 8/2013 | Xu |
| 2013/0342124 A1* | 12/2013 | Huang .............. H05B 33/0827 315/210 |
| 2014/0152182 A1 | 6/2014 | Yamamoto et al. |
| 2016/0020700 A1 | 1/2016 | Zhang et al. |
| 2017/0237345 A1 | 8/2017 | Manlove et al. |

* cited by examiner

US 10,602,577 B2

1

CONTROL CIRCUIT, CONTROL METHOD AND SWITCHING POWER SUPPLY THEREOF

RELATED APPLICATIONS

This application is a continuation of the following application, U.S. patent application Ser. No. 15/587,198, filed on May 4, 2017, and which is hereby incorporated by reference as if it is set forth in full in this specification, and which also claims the benefit of Chinese Patent Application No. 201610364912.6, filed on May 27, 2016, which is incorporated herein by reference in its entirety.

FIELD OF THE INVENTION

The present invention generally relates to the field of switching power supplies, and more particularly to control circuits and methods for a switching regulator.

BACKGROUND

Switch mode power supplies can efficiently convert electrical power from a source to a load, or to several different loads, with each corresponding to a different output. The main transistor of a switching-mode supply can switch between on and off states at a given operating frequency, and voltage regulation can be achieved by varying the ratio of the on-to-off time of the main transistor. Switch mode power supplies may have relatively high power conversion efficiency, as compared to other types of power converters. Switch mode power supplies may also be substantially smaller and lighter than a linear supply due to the smaller transformer size and weight.

DETAILED DESCRIPTION

Figure 1:
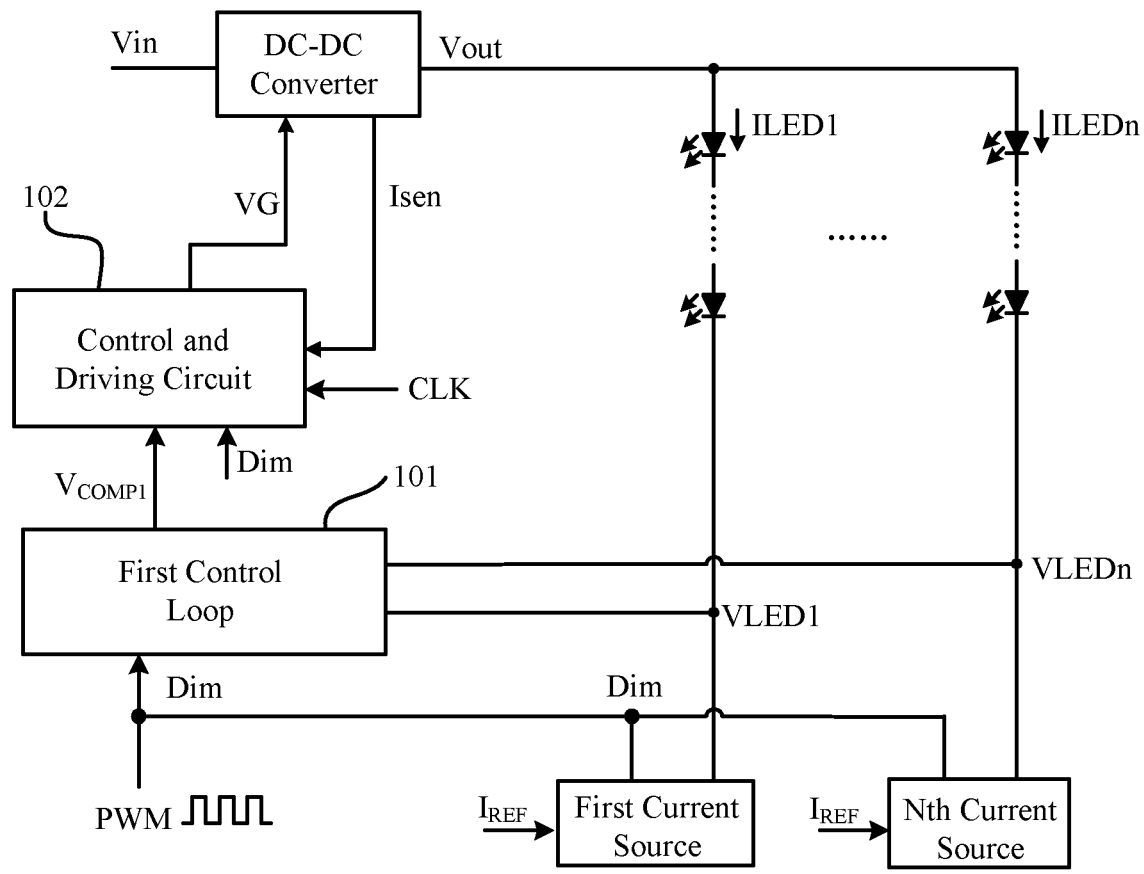
FIG. 1 is a schematic block diagram of an example switching power supply.

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

In backlight product applications, a light-emitting diode (LED) driver generally includes LED dimming functionality. In one approach, when the pulse-width modulation (PWM) dimming signal is active, the power stage circuit and LED current source can be enabled, and the LED lights accordingly lit. When the dimming signal PWM is in inactive, the power stage circuit and LED current source may be disabled in order to turn off the LED lights. In this way, the duty cycle of the dimming signal PWM can be regulated in order to adjust the average current flowing through the LED lights for dimming functionality.

For example, the dimming frequency under PWM control is generally from about 100 Hz to about 30 kHz. when the dimming frequency is relatively low and the duty cycle of the PWM signal is relatively small, the power stage circuit may stop operating for a relatively long time. For example, when the PWM dimming frequency is about 100 Hz (e.g., the period is about 10 ms) and the duty cycle is about 50%, output voltage Vout of the power stage circuit can be in an expected stable value when the dimming signal PWM is in the active state. Also, output voltage Vout may be slightly discharged and decreased due to the leakage current of the internal circuit (e.g., a diode, an output ceramic capacitor, an output voltage detection circuit, etc.) in the power stage circuit during the time period (e.g., about 5 ms) when the dimming signal PWM is in the inactive state. In this case, a ripple voltage across the ceramic capacitor may be relatively large, and the ripple frequency may be the same as the frequency of the dimming signal.

A ceramic capacitor generally has the following characteristics with respect to sound frequencies. When the ripple voltage across the ceramic capacitor reaches a certain value, the ripple voltage frequency may be in the frequency range that human ears can hear noise, which should be disallowed in electronic product applications. When the frequency of the dimming signal PWM is lower, the duty cycle thereof will be smaller, and the ripple of the output ceramic capacitor may be larger such that the noises can also be increased. In one approach, the output voltage ripple may be reduced by increasing the capacity of the output ceramic capacitor, thereby reducing the noise of the ceramic capacitor. However, this approach may increase the cost and size of the application circuit.

Referring now to FIG. 1, shown is a schematic block diagram of an example switching power supply. This particular example switching power supply can include a power stage circuit (e.g., a DC-DC converter) and a control circuit, and may be used to supply an output voltage for a load. In this example, the load can include a plurality of LED strings (e.g., LED1 to LEDn), where the positive end of the load receives an output voltage signal generated by the power stage circuit of the switching power supply.

The control circuit can include control loop 101, control and driving circuit 102, and first through Nth current sources. Control loop 101 can receive a voltage feedback signal that is a minimum value of the output voltage feedback signal of the load (e.g., the minimum value of VLED1 to VLEDn), and may generate compensation signal $V_{COMP1}$ according to this minimum value. Control and driving circuit 102 can receive compensation signal $V_{COMP1}$, and sense voltage signal Isen that can represent a current through an inductor or a power switch in a power stage circuit, and may generate an OFF signal. Control and driving circuit 102 may generate switching control signal VG according to the OFF signal and clock signal CLK (e.g., an ON signal), in order to control the switching operation of the power switch in the power stage circuit.

In order to improve the stability of the system, triangular wave signal Vripple may be superimposed on sense voltage signal Isen, to obtain voltage signal Isen1 as a feedback signal. Triangular wave signal Vripple may be generated by a triangular wave circuit based on the sequence of clock signal CLK. The first through Nth current sources can be respectively coupled in series to a plurality of LED strings. Also, a voltage at a common node of one LED string and a corresponding current source may be taken as an output voltage feedback signal of the LED string (e.g., VLED1 . . . VLEDn). The control circuit can also receive a dimming signal PWM, which is a pulse signal of a certain active width. Here, dimming signal PWM may be denoted by "Dim." The first through Nth current sources can receive dimming signal Dim, as well as control loop 101 and control and driving circuit 102.

Figure 2:
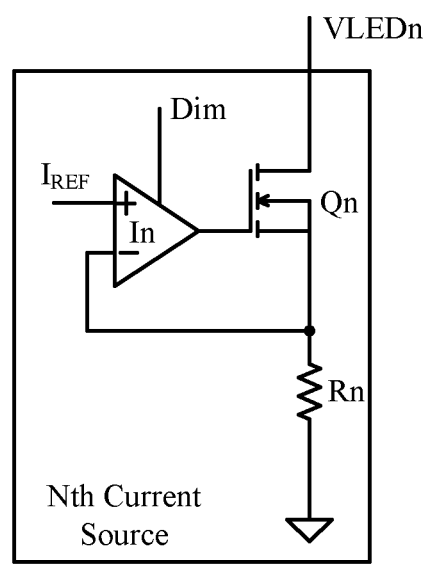
FIG. 2 is a schematic block diagram of an example current source of the example circuit of FIG. 1.

Referring now to FIG. 2, shown is a schematic block diagram of an example current source of the example circuit of FIG. 1. In this particular example, each of the current sources may have the same structure, such as a current source including switch Qn, resistor Rn, and operational amplifier "In." Resistor Rn can sample a current flowing through the LED string. Operational amplifier "In" can compare a sense signal against signal $I_{REF}$ that represents the operating current of the LED string, and may generate a switching signal to control the operating state of switch Qn, in order to control the current flowing through the LED string. Operational amplifier "In" can also receive dimming signal Dim, and may provide the switching signal when dimming signal Dim is active. The dimming signal being active can indicate that the system is in the dimming operation. The system may enter the sleep mode when dimming signal Dim is inactive, which can indicate that the system has the dimming operation presently disabled.

Figure 3:
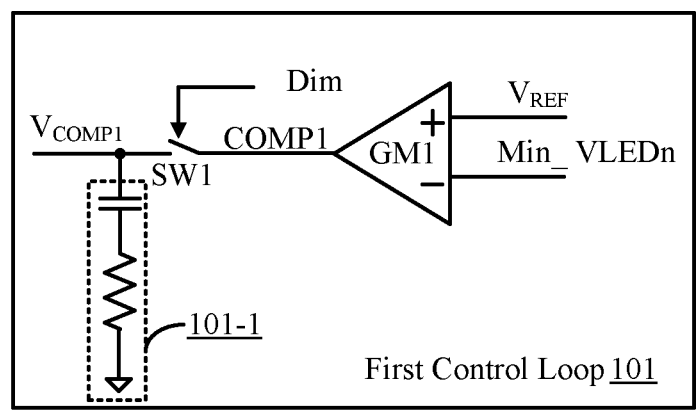
FIG. 3 is a schematic block diagram of an example first control loop of the example circuit of FIG. 1.

Referring now to FIG. 3, shown is a schematic block diagram of an example first control loop of the example circuit of FIG. 1. For example, control loop 101 can include error amplifier GM1, switch SW1, and compensation circuit 101-1. Compensation circuit 101-1 can include a capacitor and a resistor coupled in series. Control loop 101 can receive the minimum value Min_VLEDn of VLED1 to VLEDn. Error amplifier GM1 can compare the minimum value Min_VLEDn against reference voltage signal VREF, and may obtain error signal COMP1. Switch SW1 can connect between error amplifier GM1 and compensation circuit 101-1, and can be controlled by dimming signal Dim. When dimming signal Dim is active, switch SW1 may be turned on, and error signal COMP1 can be converted to compensation signal $V_{COMP1}$ by compensation circuit 101-1.

Figure 4:
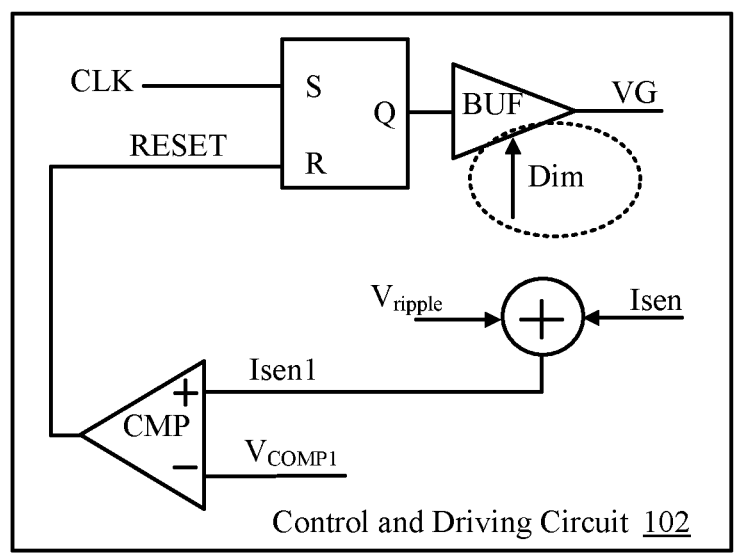
FIG. 4 is a schematic block diagram of an example control and driving circuit of the example circuit of FIG. 1.

Referring now to FIG. 4, shown is a schematic block diagram of an example control and driving circuit of the example circuit of FIG. 1. Control and driving circuit 102 can include comparator CMP, an RS flip-flop, and driving circuit BUF. Comparator CMP can receive compensation signal $V_{COMP1}$ and voltage signal Isen1, and may generate OFF signal RESET. The RS flip-flop can receive OFF signal RESET and clock signal CLK, and may generate a logic signal, and switching control signal VG through driving circuit BUF, in order to control the switching state of the power switch. Driving circuit BUF can receive dimming signal Dim, and may provide switching control signal VG when dimming signal Dim is active to indicate that the dimming operation is enabled. The system can enter into a sleep mode and deactivate switching control signal VG when dimming signal Dim is inactive to indicate that the dimming operation is disabled.

Figure 5:
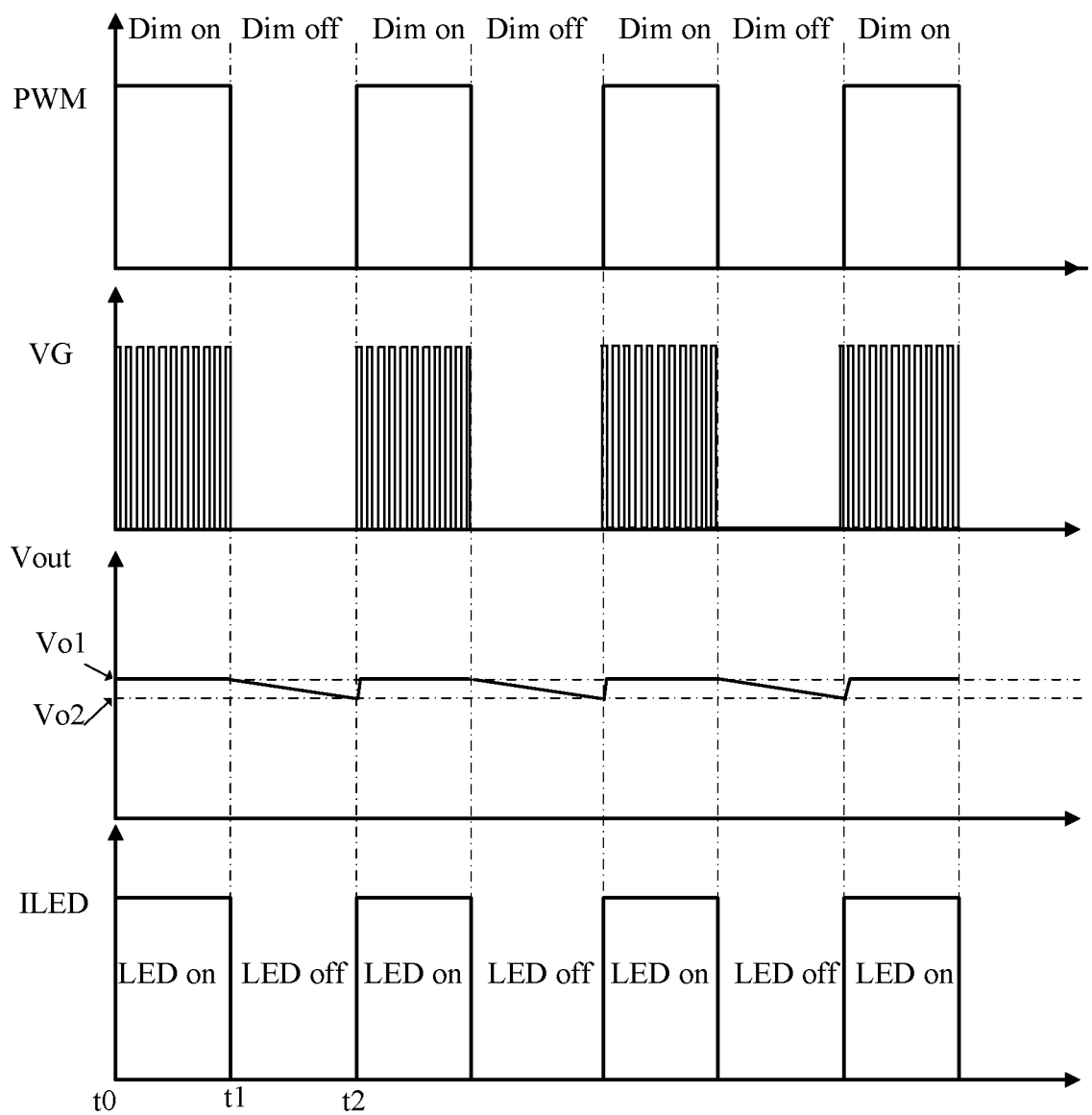
FIG. 5 is a waveform diagram of example operation of the switching power supply of FIG. 1.

Referring now to FIG. 5, shown is a waveform diagram of example operation of the switching power supply of FIG. 1. Here, dimming signal PWM (or Dim), switching control signal VG, output voltage Vout, and the current through the LED string, can all vary together along with time, as shown. At time t0, dimming signal Dim is active to indicate that the dimming operation is enabled for the system. Control and driving circuit 102 can control the power switch to turn off according to compensation signal $V_{COMP1}$. From t0 to t1, output voltage Vout of the power stage circuit may be substantially maintained at Vo1. At time t1, dimming signal Dim may be deactivated to indicate that the dimming operation is disabled. In this case, the current source, control loop 101, and the driving circuit may all enter into the sleep mode. Also, switching control signal VG may be deactivated, the LED string can be turned off, and the output voltage at the output terminal may decrease (e.g., to Vo2 at time t2) as the power switch is turned off. As such, relatively large ripples can appear in the output voltage, and across the output ceramic capacitor, which can result in relatively high circuit noise levels.

In one embodiment, a control circuit for generating a switching control signal to control switching operations of a power switch in a power stage circuit, can include: (i) a first control loop configured to receive a first voltage feedback signal, and to generate a first compensation signal; (ii) a voltage regulating circuit configured to receive an output voltage signal of the power stage circuit, and to generate a second compensation signal according to a difference between an output voltage signal of the power stage circuit during different time periods; and (iii) a control and driving circuit configured to receive the first and second compensation signals and a sense voltage signal that represents a current through an inductor of the power stage circuit, and to generate an OFF signal, and a switching control signal according to the OFF signal and an ON signal.

Figure 6:
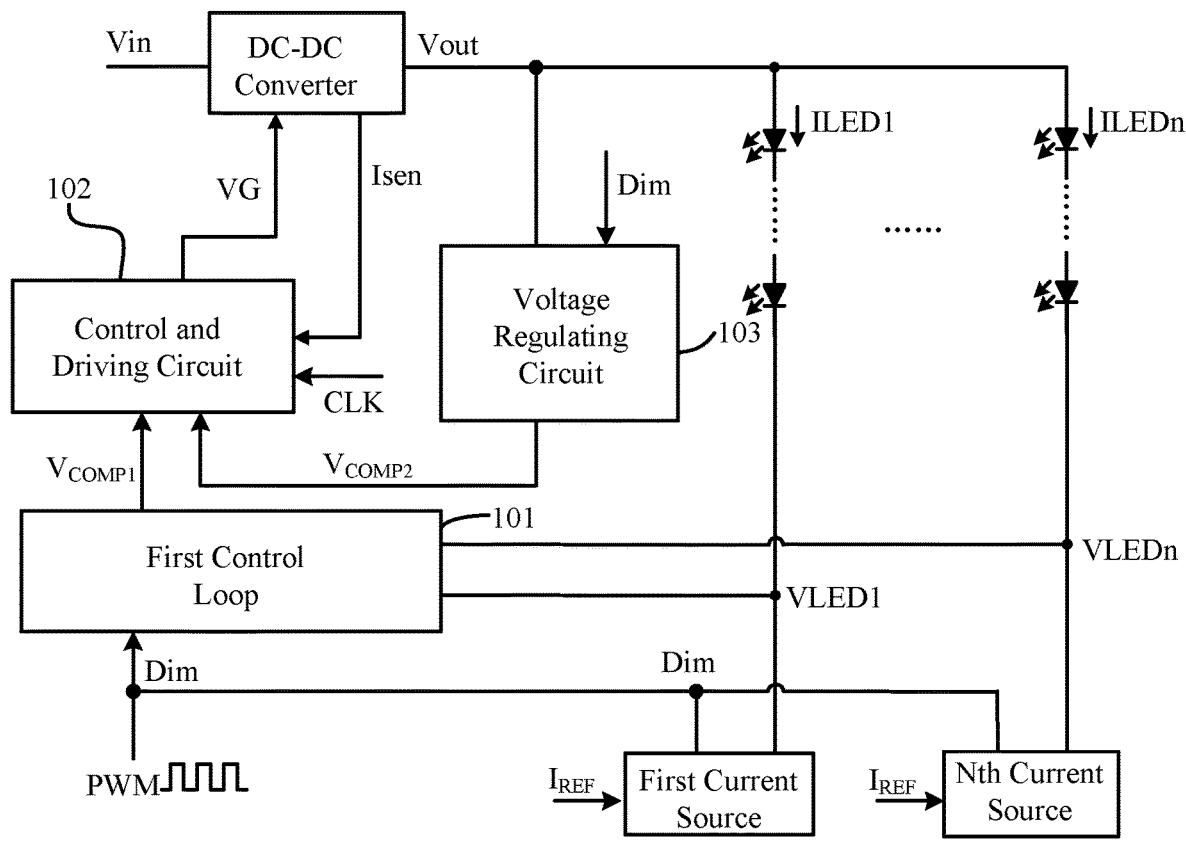
FIG. 6 is a schematic block diagram of an example switching power supply, in accordance with embodiments of the present invention.

Referring now to FIG. 6, shown is a schematic block diagram of an example switching power supply, in accordance with embodiments of the present invention. The switching power supply can include a power stage circuit (e.g., a DC-DC converter) and a control circuit, and may be used to supply an output voltage for a load. For example, the load can include a plurality of LED strings (e.g., LED1 to LEDn), and the positive end of the load can receive an output voltage signal generated by the power stage circuit of the switching power supply. The control circuit can include control loop 101, control and driving circuit 102, first through Nth current sources, and voltage regulating circuit 103. Control loop 101 can receive a voltage feedback signal that is a minimum value of the output voltage feedback signal of the load (e.g., the minimum value of VLED1 to VLEDn), and may generate compensation signal $V_{COMP1}$ according to this minimum value.

Voltage regulating circuit 103 can connect between an output terminal of the power stage circuit and control and driving circuit 102. Voltage regulating circuit 103 can receive output voltage signal Vout of the power stage circuit, and may generate compensation signal $V_{COMP2}$ according to a difference between output voltage signals in different time periods. In this example, one operating period can include first and second operating time periods, where the first operating time period can occur before the second operating time period. In the first operating time period, the system may be in a normal dimming state, and in the second operating time period, the system may be in the sleep mode.

In the first operating time period, voltage regulating circuit 103 may provide a voltage maintenance signal according to the output voltage signal of the power stage circuit. In the second operating time period, voltage regulating circuit 103 may provide compensation signal $V_{COMP2}$ according to the difference between the output voltage signal of the power stage circuit and the voltage maintenance signal. Control and driving circuit 102 can receive compensation signals $V_{COMP1}$ and $V_{COMP2}$, and sense voltage signal Isen that may represent a current through an inductor of the power stage circuit, and can generate an OFF signal. Control and driving circuit 102 may generate switching control signal VG according to the OFF signal and clock signal CLK, in order to control the switching operation of the power switch in the power stage circuit.

In the first operating time period, control and driving circuit 102 may generate the OFF signal according to compensation signal $V_{COMP1}$. In the second operating time period, control and driving circuit 102 may generate the OFF signal according to compensation signal $V_{COMP2}$. In this example, dimming signal Dim may be active during the first operating time period, and inactive during the second operating state. Thus, when dimming signal Dim is inactive, the system may disable dimming, and the power switch can be controlled according to compensation signal $V_{COMP2}$, such that output voltage Vout may not drop too much, and can thereby avoiding large ripples.

Figure 7:
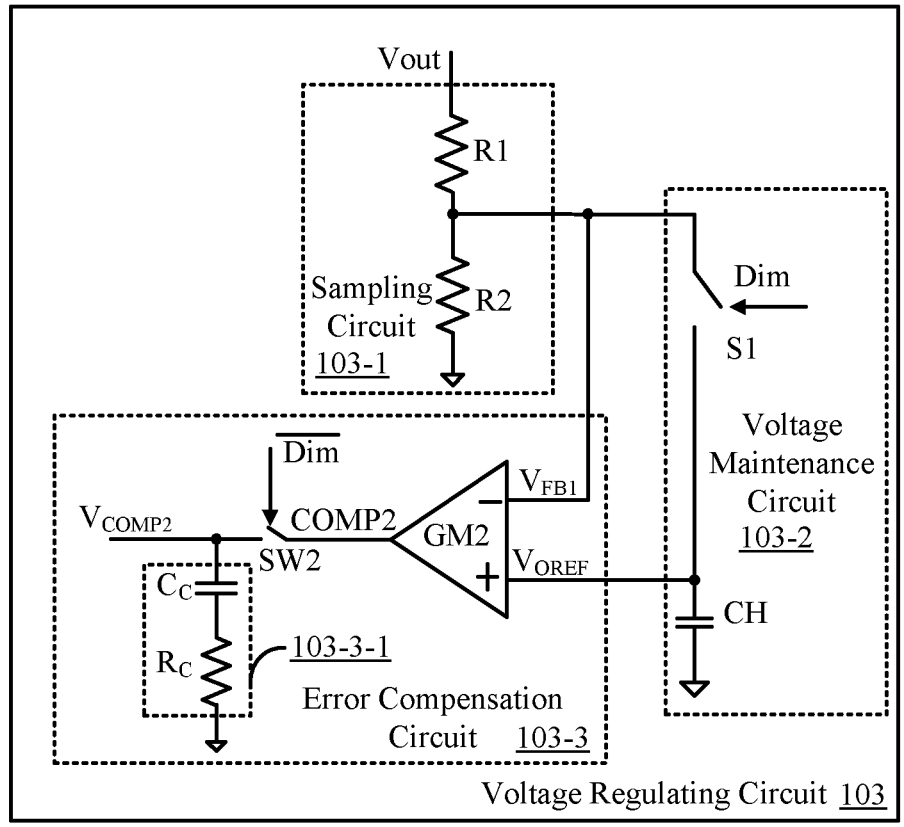
FIG. 7 is a schematic block diagram of an example voltage regulating circuit of the example circuit of FIG. 6, in accordance with embodiments of the present invention.

Referring now to FIG. 7, shown is a schematic block diagram of an example voltage regulating circuit of the example circuit of FIG. 6, in accordance with embodiments of the present invention. Voltage regulating circuit 103 can include sampling circuit 103-1, voltage maintenance circuit 103-2, and error compensation circuit 103-3. Sampling circuit 103-1 may be a division resistor loop including resistors R1 and R2. Sampling circuit 103-1 can receive output voltage signal Vout of the power stage circuit, and may generate sense voltage signal $V_{FB1}$. Voltage maintenance circuit 103-2 can include switch S1 and maintenance capacitor CH coupled in series between an output terminal of sampling circuit 103-1 and ground, and switch S1 may be controlled by dimming signal Dim. Thus, in the first operating time period, switch S1 may be on, and in the second operating time period, switch S1 may be off. When switch S1 is turned on, the sense voltage signal can charge maintenance capacitor CH, and a voltage across the maintenance capacitor can be configured as voltage maintenance signal $V_{OREF}$.

Error compensation circuit 103-3 can include error amplifier GM2, switch SW2, and compensation circuit 103-3-1. Error amplifier GM2 can receive sense voltage signal $V_{FB1}$ and voltage maintenance signal $V_{OREF}$, and may generate error signal COMP2. Switch SW2 can connect between an output terminal of error amplifier GM2 and compensation circuit 103-3-1, and may be controlled by an inverted version of dimming signal Dim. Thus, switch SW2 may be off during the first operating time period, and may be on during the second operating time period. Compensation circuit 103-3-1 can receive error signal COMP2, and may generate compensation signal $V_{COMP2}$.

Figure 8:
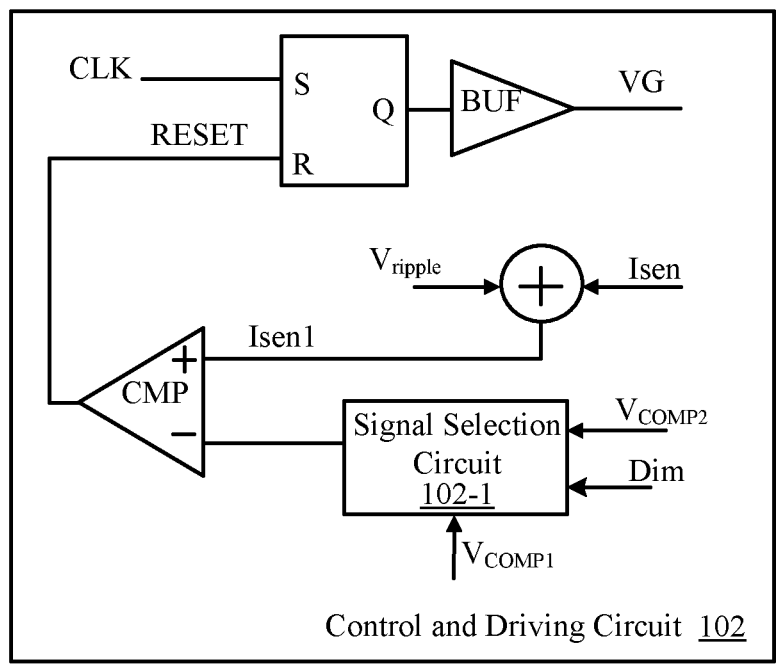
FIG. 8 is a schematic block diagram of an example control and driving circuit of the example circuit of FIG. 6, in accordance with embodiments of the present invention.

Referring now to FIG. 8, shown is a schematic block diagram of an example control and driving circuit of the example circuit of FIG. 6, in accordance with embodiments of the present invention. In this particular example, control and driving circuit 102 can include a comparison circuit (e.g., comparator CMP), a logic circuit (e.g., an RS flip-flop), driving circuit BUF, and signal selection circuit 102-1. In this example, signal selection circuit 102-1 can receive compensation signals $V_{COMP1}$ and $V_{COMP2}$. In the first operating time period (e.g., the system is in the dimming operation state), signal selection circuit 102-1 can provide compensation signal $V_{COMP1}$ to comparator CMP. In the second operating time period (e.g., the system is in the sleep mode), signal selection circuit 102-1 may provide compensation signal $V_{COMP2}$ to comparator CMP.

Comparator CMP can receive compensation signal $V_{COMP1}$ (or compensation signal $V_{COMP2}$) and voltage signal Isen1, and may generate OFF signal RESET. The RS flip-flop can receive OFF signal RESET and clock signal CLK, and may generate the logic signal, and switching control signal VG through driving circuit BUF, in order to control the switching operation of the power switch. In this example, driving circuit BUF may not receive dimming signal Dim, and driving circuit BUF can always operate (e.g., have no enable/disable control) in order to maintain the output voltage to be substantially constant in the sleep mode.

Figure 9:
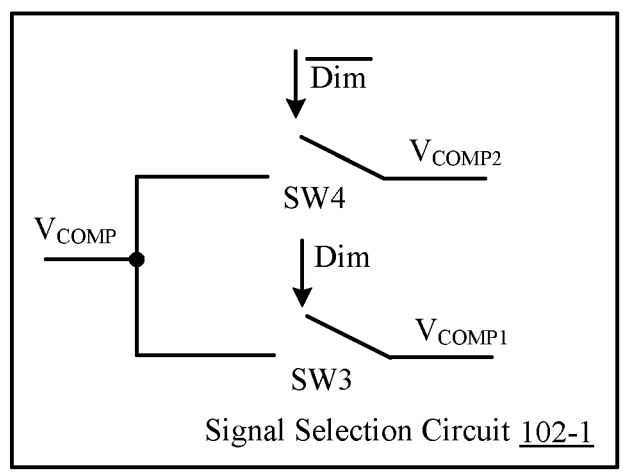
FIG. 9 is a schematic block diagram of an example signal selection circuit of the example circuit of FIG. 8, in accordance with embodiments of the present invention.

Referring now to FIG. 9, shown is a schematic block diagram of an example signal selection circuit of the example circuit of FIG. 8, in accordance with embodiments of the present invention. Signal selection circuit 102-1 can include switch SW3 and switch SW4. The first terminal of switch SW3 can receive compensation signal $V_{COMP1}$, and the first terminal of switch SW4 can receive compensation signal $V_{COMP2}$. The second terminals of switches SW3 and SW4 can connect to a common node that is coupled to the input terminal of comparator CMP. Switch SW3 can be controlled by dimming signal Dim, and switch SW4 may be controlled by an inverted version of dimming signal Dim. In the first operating time period, switch SW3 may be on, and switch SW4 can be off. In the second operating time period, switch SW3 can be off, and switch SW4 may be on.

Figure 10:
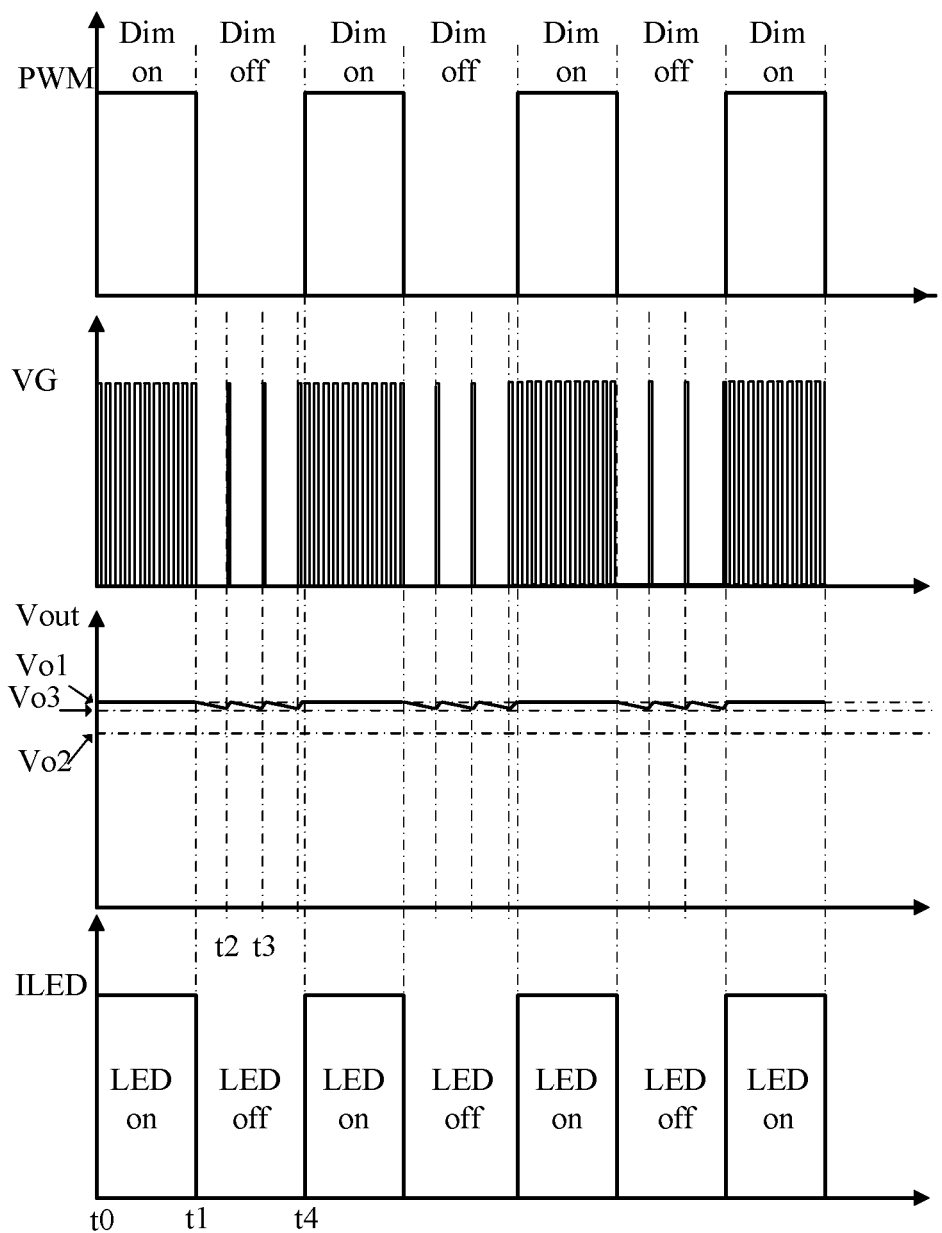
FIG. 10 is a waveform diagram of example operation of the switching power supply of FIG. 6, in accordance with embodiments of the present invention.

Referring now to FIG. 10, shown is a waveform diagram of example operation of the switching power supply of FIG. 6, in accordance with embodiments of the present invention. As shown, dimming signal PWM (or Dim), switching control signal VG, output voltage Vout, and the current through the LED string may all vary along with time. At time t0, dimming signal Dim may be active (the system is in the dimming operation) and control and driving circuit 102 can control the power switch to turn off according to compensation signal $V_{COMP1}$. From t0 to t1, output voltage Vout of the power stage circuit may be substantially maintained at Vo1.

At time t1, dimming signal Dim can be deactivated (the system stops dimming). In this case, control and driving circuit 102 can control the switching operation of the power switch according to compensation signal $V_{COMP2}$. For example, at t2 and t3, control and driving circuit 102 can control the power switch to turn on for a relatively short time, and thus the output voltage may not drop significantly (e.g., the output voltage decreases to Vo3). By comparing Vo2 and Vo3, it can be seen that the output voltage ripple in this case is relatively small, thus the voltage ripple on the ceramic capacitor can also be relatively small, which may reduce associated circuit noise.

By applying the control circuit of particular embodiments in an LED dimming circuit, the output voltage ripple and associated noises can be reduced, and the output voltage may recover to the expected value in the next period relatively quickly due to the relatively small voltage drop. Because the system response is relatively fast, LED light operation is more stable, as compared to other approaches. Those skilled in the art will recognize that the control circuit is not limited to the above mentioned LED dimming circuit, but can also be applied to other circuits with output voltage ripple requirements (e.g., an AC-DC circuit, a DC-DC circuit, etc.).

In one embodiment, a method of generating a switching control signal to control switching operations of a power switch in a power stage circuit, can include: (i) receiving a first voltage feedback signal, and generating a first compensation signal; (ii) receiving an output voltage signal of the power stage circuit, and generating a second compensation signal according to a difference between an output voltage signal of the power stage circuit in different time periods; (iii) receiving the first and second compensation signals and a sense voltage signal that represents a current through an inductor of the power stage circuit, and generating an OFF signal; and (iv) generating, by a control and driving circuit, a switching control signal according to the OFF signal and an ON signal.

Figure 11:
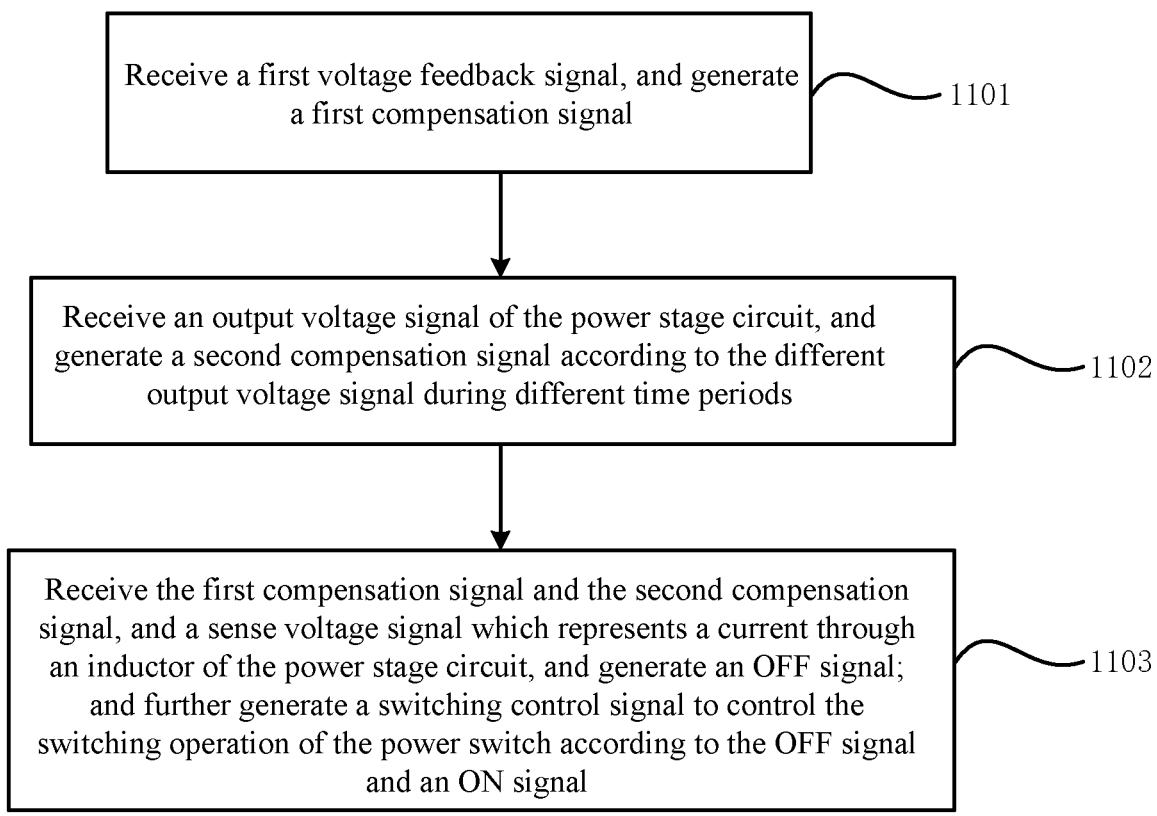
FIG. 11 is a flow diagram of example operation of the switching power supply of FIG. 6, in accordance with embodiments of the present invention.

Referring now to FIG. 11, shown is a flow diagram of example operation of the switching power supply of FIG. 6, in accordance with embodiments of the present invention. In this example, the control method for controlling the switching operation of the power switch in the power stage circuit, can be employed in order to control the output voltage of the power stage circuit. The control method can include, at S1101, receiving a first voltage feedback signal, and generating a first compensation signal (e.g., $V_{COMP1}$). At S1102, an output voltage signal of the power stage circuit can be received, and a second compensation signal (e.g., $V_{COMP2}$) can be generated according to a difference between output voltage signals during different time periods.

At S1103, the first and second compensation signals can be received, and a sense voltage signal that represents a current through an inductor of the power stage circuit can be generated also, an OFF signal can be generated. Also, a switching control signal can be generated to control the switching operation of the power switch according to the OFF signal and an ON signal. For example, in a first operating time period, the control circuit may be in a normal operation state (e.g., a dimming operation), and can generate the OFF signal according to the first compensation signal. In a second operating time period (e.g., a sleep mode or non-dimming operation), the control circuit can generate the OFF signal according to the second compensation signal.

For example, generating the second compensation signal can include, in one operating period, providing a voltage maintenance signal according to the current output voltage signal of the power stage circuit. Also, in the second operating time period, the second compensation signal may be provided according to the difference between the current output voltage signal of the power stage circuit and the voltage maintenance signal.

For example, generating the switching control signal can include, in the first operating time period, comparing the first compensation signal against the sense voltage signal that represents the current through the inductor of the power stage circuit, and generating the OFF signal. In the second operating time period, the second compensation signal can be compared against the sense voltage signal that represents the current through the inductor of the power stage circuit, and the OFF signal may be generated. The switching control signal can be generated according to the OFF signal and the ON signal.

The embodiments were chosen and described in order to best explain the principles of the invention and its practical applications, to thereby enable others skilled in the art to best utilize the invention and various embodiments with modifications as are suited to particular use(s) contemplated. It is intended that the scope of the invention be defined by the claims appended hereto and their equivalents.

What is claimed is:

1. A control circuit for generating a switching control signal to control switching operations of a power switch in a power stage circuit, the control circuit comprising:
   a) a first control loop configured to receive a first voltage feedback signal, and to generate a first compensation signal;
   b) a voltage regulating circuit configured to receive an output voltage signal of said power stage circuit, and to generate a second compensation signal according to a difference in said output voltage signal at a transition between a first and a second operating time period of said power stage circuit and during said second operating time period, wherein no current is provided to a load of said power stage circuit during said second operating time period; and
   c) a control and driving circuit configured to receive said first and second compensation signals and a first sense voltage signal that represents a current through an inductor of said power stage circuit, and to generate said switching control signal comprising comparing said first compensation signal against said first sense voltage signal when in said first operating time period, and comparing said second compensation signal against said first sense voltage signal when in said second operating time period.

2. The control circuit of claim 1, wherein:
   a) said voltage regulating circuit is configured to generate a voltage maintenance signal based on said output voltage signal during said first operating time period, wherein a dimming signal is active during said first operating time period; and
   b) said voltage maintenance signal is maintained during said second operating time period, wherein said dimming signal is inactive during said second operating time period.

3. The control circuit of claim 2, wherein:
   a) said first operating time period occurs prior to said second operating time period in one operating period;
   b) in said first operating time period, said voltage regulating circuit is configured to generate said voltage maintenance signal according to a current output voltage signal of said power stage circuit; and
   c) in said second operating time period, said voltage regulating circuit is configured to generate said second compensation signal according to a difference between said current output voltage signal and said voltage maintenance signal.

4. The control circuit of claim 3, wherein said voltage regulating circuit comprises:

a) a sampling circuit configured to receive said output voltage signal of said power stage circuit, and to generate an output voltage feedback signal;
b) a voltage maintenance circuit configured to receive said dimming signal and said output voltage feedback signal, and to generate said voltage maintenance signal in said first operating time period; and
c) an error compensation circuit configured to receive said output voltage feedback signal and said voltage maintenance signal, and to provide an error signal to a compensation circuit for generating said second compensation signal in said second operating time period.

5. The control circuit of claim 4, wherein:
a) said voltage maintenance circuit comprises a first switch and a maintenance capacitor that are coupled in series between an output terminal of said sampling circuit and ground, wherein said voltage maintenance signal is generated by charging said maintenance capacitor;
b) said first switch is on during said first operating time period, and said first switch is off during said second operating time period; and
c) a voltage across said maintenance capacitor is configured as said voltage maintenance signal.

6. The control circuit of claim 4, wherein said error compensation circuit comprises:
a) an error amplifier configured to receive said output voltage feedback signal and said voltage maintenance signal, and to generate said error signal;
b) a second switch coupled between an output terminal of said error amplifier and said compensation circuit, wherein said second switch is off during said first operating time period, and is on during said second operating time period; and
c) said compensation circuit being configured to receive said error signal, and to generate said second compensation signal.

7. The control circuit of claim 2, wherein said control and driving circuit comprises:
a) a comparison circuit configured to compare one of said first and second compensation signals against said first sense voltage signal, and to generate an OFF signal; and
b) a logic circuit configured to receive said OFF signal and an ON signal, and to generate said switching control signal.

8. The control circuit of claim 7, wherein said control and driving circuit further comprises:
a) a signal selection circuit configured to receive said first and second compensation signals;
b) said signal selection circuit being configured to provide said first compensation signal to said comparison circuit during said first operating time period; and
c) said signal selection circuit being configured to provide said second compensation signal to said comparison circuit during said second operating time period.

9. The control circuit of claim 8, wherein said signal selection circuit comprises:
a) a third switch having a first terminal configured to receive said first compensation signal, wherein said third switch is on during said first operating time period, and said third switch is off during said second operating time period; and
b) a fourth switch having a first terminal configured to receive said second compensation signal, wherein second terminals of said third and fourth switches are coupled to an input terminal of said comparison circuit, and wherein said fourth switch is off during said first operating time period, and said fourth switch is on during said second operating time period.

10. A method of generating a switching control signal to control switching operations of a power switch in a power stage circuit, the method comprising:
a) receiving a first voltage feedback signal, and generating a first compensation signal;
b) receiving an output voltage signal of said power stage circuit, and generating a second compensation signal according to a difference in said output voltage signal at a transition between a first and a second operating time period of said power stage circuit and during said second operating time period, wherein no current is provided to a load of said power stage circuit during said second operating time period;
c) receiving said first and second compensation signals and a first sense voltage signal that represents a current through an inductor of said power stage circuit; and
d) generating, by a control and driving circuit, said switching control signal comprising comparing said first compensation signal against said first sense voltage signal when in said first operating time period, and comparing said second compensation signal against said first sense voltage signal when in said second operating time period.

11. The method of claim 10, further comprising:
a) generating a voltage maintenance signal based on said output voltage signal during said first operating time period, wherein a dimming signal is active during said first operating time period; and
b) maintaining said voltage maintenance signal during said second operating time period, wherein said dimming signal is inactive during said second operating time period.

12. The method of claim 11, wherein said generating said second compensation signal comprises:
a) generating said voltage maintenance signal according to a current output voltage signal of said power stage circuit during said first operating time period; and
b) generating said second compensation signal according to a difference between said current output voltage signal of said power stage circuit and said voltage maintenance signal during said second operating time period.

13. The method of claim 10, wherein said generating said switching control signal comprises:
a) generating an OFF signal in said first operating time period by comparing said first compensation signal against said first sense voltage signal;
b) generating said OFF signal in said second operating time period by comparing said second compensation signal against said first sense voltage signal; and
c) generating said switching control signal according to said OFF signal and an ON signal.

14. A switching power supply, comprising the control circuit of claim 1, and wherein:
a) said power stage circuit is configured to receive an external power supply, and to generate said output voltage signal for said load; and
b) said power stage circuit is configured to generate said first voltage feedback signal that represents an output voltage feedback signal of said load.

15. The switching power supply of claim 14, wherein:
a) said load comprises a plurality of light-emitting diode (LED) strings; and b) said first voltage feedback signal is a minimum value of said output voltage feedback signals of said plurality of said LED strings.

16. The switching power supply of claim 15, wherein:
a) said control circuit comprises a plurality of current sources that correspond to said plurality of LED strings;
b) each of said plurality of current sources is configured to receive said output voltage feedback signal of said LED string and a dimming signal; and
c) when said dimming signal is active, each of said plurality of current sources is configured to regulate a current through a corresponding LED string according to said dimming signal and a reference current signal.

17. The control circuit of claim 2, wherein said second compensation signal is generated by using said voltage maintenance signal during said second operating time period.

18. The method of claim 11, wherein said second compensation signal is generated by using said voltage maintenance signal during said second operating time period.

19. The control circuit of claim 1, wherein said transition between said first and second operating time periods is determined by transition of a dimming signal from active to inactive.

20. The method of claim 10, wherein said transition between said first and second operating time periods is determined by transition of a dimming signal from active to inactive.

* * * * *